(12) United States Patent
Nair et al.

(10) Patent No.: US 8,966,587 B2
(45) Date of Patent: Feb. 24, 2015

(54) IDENTITY MANAGEMENT VIA CLOUD

(75) Inventors: Jiji Nair, Santa Clara, CA (US); Bharat Welingkar, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 593 days.

(21) Appl. No.: 12/869,516

(22) Filed: Aug. 26, 2010

(65) Prior Publication Data

US 2011/0302630 A1 Dec. 8, 2011

Related U.S. Application Data

(60) Provisional application No. 61/351,229, filed on Jun. 3, 2010.

(51) Int. Cl.

| G06F 7/04 | (2006.01) |
|---|---|
| G06F 15/16 | (2006.01) |
| G06F 12/14 | (2006.01) |
| G06F 21/41 | (2013.01) |
| H04L 29/06 | (2006.01) |
| G06F 21/31 | (2013.01) |

(52) U.S. Cl.
CPC .............. *G06F 21/41* (2013.01); *H04L 63/10* (2013.01); *G06F 21/31* (2013.01)
USPC ...................... 726/4; 726/5; 726/17; 726/21

(58) Field of Classification Search
None
See application file for complete search history.

(56) References Cited

U.S. PATENT DOCUMENTS

| 6,314,108 | B1 * | 11/2001 | Ramasubramani et al. .. 370/465 |
| 7,885,635 | B2 * | 2/2011 | Laursen et al. ............... 455/403 |
| 2003/0233458 | A1 | 12/2003 | Kwon et al. |
| 2005/0022006 | A1 | 1/2005 | Bass et al. |
| 2007/0115940 | A1 * | 5/2007 | Kamen et al. ................. 370/352 |
| 2007/0174777 | A1 * | 7/2007 | Finley et al. .................. 715/734 |
| 2007/0257915 | A1 * | 11/2007 | Kutaragi ....................... 345/427 |
| 2008/0040427 | A1 * | 2/2008 | Shroff et al. .................. 709/204 |

(Continued)

FOREIGN PATENT DOCUMENTS

KR   10-2006-0027564 A   3/2006

OTHER PUBLICATIONS

International Search Report and Written Opinion mailed Dec. 13, 2011, issued in international application No. PCT/US2011/035941.

(Continued)

*Primary Examiner* — Fatoumata Traore
(74) *Attorney, Agent, or Firm* — Kilpatrick Townsend & Stockton LLP

(57) ABSTRACT

A system and method of maintaining a user profile for a handheld computer in a shared, scalable computing resource is described. The method includes receiving user profile data from the handheld computer at the shared, scalable computing resource, the user profile data comprising a user security factor. The user profile data is received via a secure wireless communication protocol having authentication of an identity of the handheld computer. The method includes storing the user profile data on the shared, scalable computing resource as a portion of a user profile, the user profile further comprising user preference data. The method further includes receiving the user security factor from a second computing device. The user security factor is received via a secure wireless communication protocol having authentication of an identity of the second computing device. The method further includes downloading user preference data to the second computing device.

18 Claims, 5 Drawing Sheets

(56) References Cited

U.S. PATENT DOCUMENTS

2009/0027700 A1* 1/2009 Kim et al. .................. 358/1.6
2009/0248632 A1* 10/2009 Subramanian ................ 707/3
2011/0026704 A1* 2/2011 Connelly et al. ............ 379/219

OTHER PUBLICATIONS

Supplementary European Search Report—EP11790244, Search Authority—The Munich, Jun. 5, 2014.

* cited by examiner

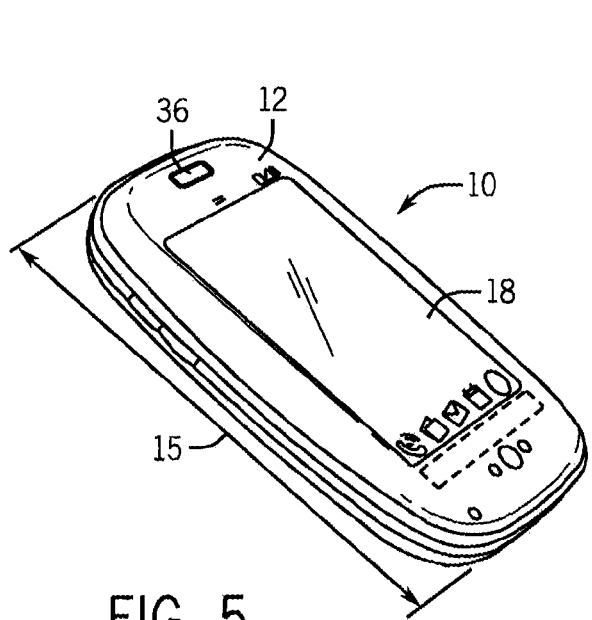
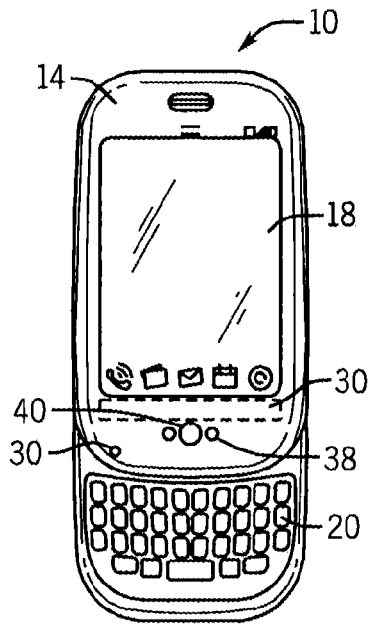
FIG. 5
FIG. 6
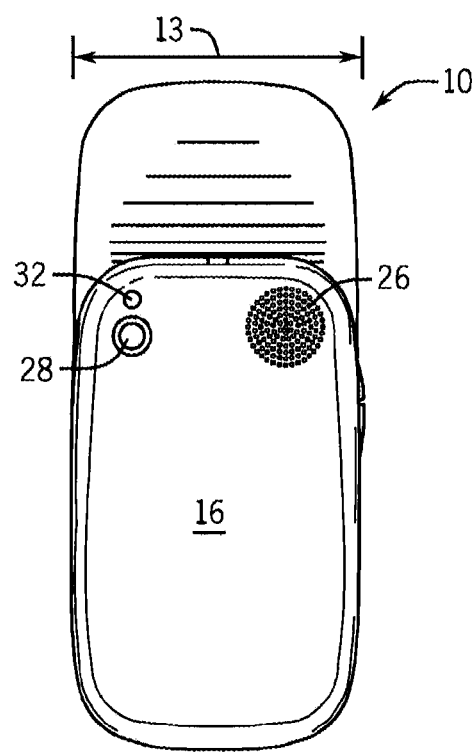
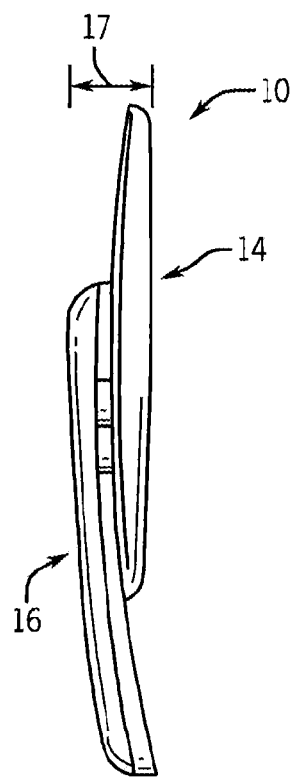
FIG. 7
FIG. 8

IDENTITY MANAGEMENT VIA CLOUD

CROSS-REFERENCE TO RELATED PATENT APPLICATIONS

This application claims the benefit of U.S. Provisional Application No. 61/351,229 filed Jun. 3, 2010, which is incorporated herein by reference in its entirety.

BACKGROUND

The present application relates generally to user accounts or identities for mobile computing devices.

BRIEF DESCRIPTION OF THE DRAWINGS

FIG. 5 is a perspective view of a mobile computing device according to an exemplary embodiment.

FIG. 6 is a front view of the mobile computing device of FIG. 5 in an extended configuration according to an exemplary embodiment.

FIG. 7 is a back view of the mobile computing device of FIG. 5 in an extended configuration according to an exemplary embodiment.

FIG. 8 is a side view of the mobile computing device of FIG. 5 in an extended configuration according to an exemplary embodiment.

DETAILED DESCRIPTION OF THE PREFERRED EMBODIMENTS

One or more embodiments described herein may provide for easier upgrading of customers with a new phone. One or more embodiments may allow use of a mobile device to securely consolidate private user information, such as bank account numbers, credit card information, email, messages, etc. One or more embodiments may use account information to secure the identity of a user because the account information is encrypted and can not be spoofed. One or more embodiments may provide a strict certification of who the user is and allow financial transactions using a handheld computing device.

Figure 1:
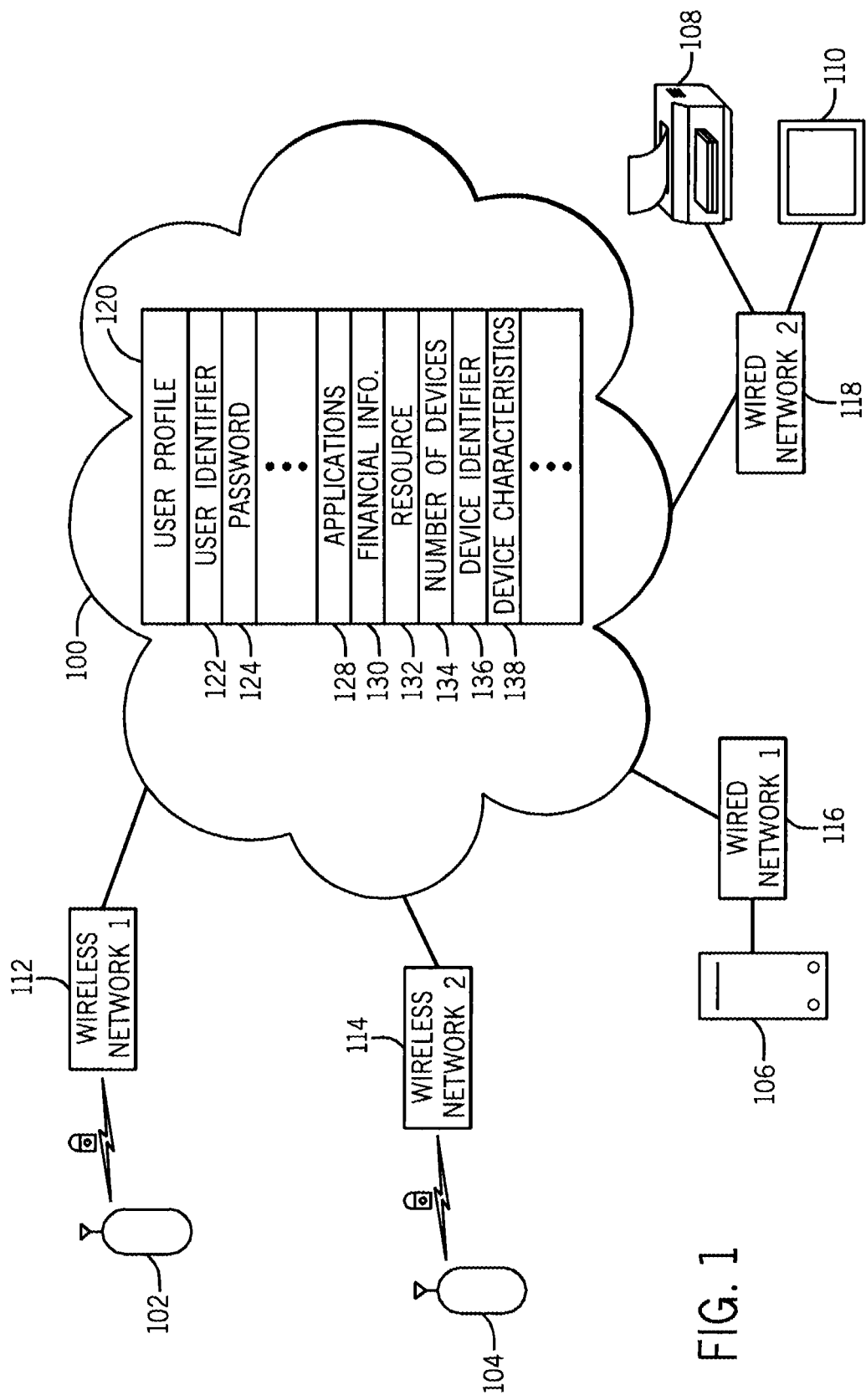
FIG. 1 is a block diagram of a system for storing a user profile in a cloud, according to an exemplary embodiment.

Referring first to FIG. 1, a block diagram of a system for storing and managing a user profile or user identity will be described, according to an exemplary embodiment. A user profile is maintained in a cloud so that when accessing a new computing device, all the user needs to provide is their a user security factor, such as a unique user identifier and password, to the cloud via the new computing device. At that point, the cloud can download the user's data, such as user preferences, etc., and attach the user's identity to the new device. User data can include billing information, passwords used to login and maintain financial transactions, etc. The devices may be mobile phones, which are personal and encrypted, which will allow the user to uniquely identify him or herself in financial and personal transactions. Further, a user can have multiple devices which can use the same user identity.

FIG. 1 illustrates an exemplary system, in which a shared, scalable computing resource 100 is configured or programmed to store one or more user profiles for different persons who are users. The persons are users of computing devices, such as mobile computing devices 102 and/or 104, personal (non-mobile) computer 106, a networked printer 108, a networked digital picture frame 110, or other computing devices such as a phone or tablet computer, non-cellular device, etc. Various wireless and/or wired networks are in communication with computing resource 100, such as wireless networks 112, 114 and wired networks 116, 118. Wireless networks 112, 114 are operated by different wireless carriers, such as Verizon Wireless, Sprint, AT&T, U.S. Cellular, and other entities operating wireless networks using different wireless networks 112, 114.

The shared, scalable computing resource 100 is a cloud computing resource in this exemplary embodiment, but may alternatively be other server-based computing resources. Computing resource 100 may comprise a data center having one or more computer servers accessible via the Internet. The resource is shared in that different business entities or computing processes may use the resource or infrastructure simultaneously to serve the multiple users. Computing resource 100 is scalable in that resources may be provisioned or allocated in real time on a self-service basis. Resource 100 may be configured to provide a support infrastructure to devices while reducing the need for the devices to need information about the specific server computer or computers providing services.

In this embodiment, a user profile 120 or user account is stored in or on the computing resource 100, making it available to a plurality of different networks and a plurality of different computing devices. User profile 120 is a data file or files comprising data representing a user identity. User profile 120 may also comprise data representing user preferences, such as password, first/last name, email address, security questions/answer, billing address, mailing address, bookmarks, favorites, screen color, background photo, or any of a wide range of other user preferences, such as those described herein. User profile 120 may comprise a user identifier 122, such as a username, e-mail address, or other identifier. The identifier may uniquely identify a person, in that the identifier may be used by only one person who uses the system described herein. User profile 120 may comprise a user password 124, such as an alphanumeric code chosen by the person or assigned to the person by the system. Applications 128 may comprise data associated with one or more software applications operable on device 102 which have been associated with user profile 120 through user selection (for example from an application store accessible operable on cloud 100 or another server computer and accessible by device 102) and/or associated with user profile 120 by a manufacturer of device 102, wireless carrier associated with device 102, corporate enterprise associated with device 102, or other source. The data associated with each application may comprise a uniform resource locator identifying a location from which the application can be downloaded and/or updated, an alphanumeric code identifying the application, a version number of the application, a developer name of an entity that developed the application, high scores for a gaming application, personal preferences set by a user for the application (such as screen color, defaults, favorites, etc.), or other data.

User profile 120 may further comprise financial information 130. The financial information may comprise bank account numbers, credit card numbers, balances, account information of accounts with third party payment services such as Paypal, personal identification numbers (PINs), username/passwords for financial accounts, billing information (such as billing address), or other financial information. User profile may further comprise other resources 132 associated with the user, such as Microsoft Exchange account information for e-mail, calendar, and/or contact accounts, pictures or photograph files stored in or synchronized between the cloud and a device, video files stored in or synchronized between the cloud and the device, profile data that is shared between devices (such as PIM data), etc.

User profile 120 may further comprise a number 134 representing a maximum number of devices that the user profile may be associated with at one time, such as one, two, three, or more than three. Number 134 may be set by a user, manufacturer of device 102, a wireless carrier associated with device 102, a corporate enterprise associated with device 102, or other entity. Cloud 100 may then be configured to monitor the number of devices 102-110 being associated with or used with user profile 120 and to deny further devices from using user profile 120 after the predetermined number 134 has been met. Cloud 100 may then allow further devices to use user profile 120 after at least one device has been disassociated with user profile 120.

User profile 120 may further comprise information about the one or more devices associated with the user profile. For example, a device identifier 136 may comprise a device serial number or other unique device identifier (e.g., which may be an encrypted value of data on a SIM data card, or unencrypted data). Device characteristics 138 may comprise information such as primary function (e.g. personal computer, printer, picture frame, smartphone, etc.), data network and/or voice network compatibility (GSM, CDMA, EV-DO, LTE, etc.), an operating system and version operating on device 138 (e.g., webOS, Windows Mobile, etc.), screen size and/or resolution, location-based determination circuits and types (e.g., GPS, assisted GPS, cell ID, dead reckoning, etc.), wireless circuits and capabilities (e.g., Wi-Fi, infrared, Bluetooth, etc.), and/or other characteristics of the device.

User profile 120 may further be configured to store data indicative of a current state of the one or more devices associated with the user profile. Current states may comprise in use, not in use, locked, not locked, active, inactive, etc. Account states may comprise active, inactive, e-mail verified/not verified, suspended, locked/not locked, etc.

Part or all of the user profile may be stored in encrypted or unencrypted format on computing resource 100 and/or on one or more of devices 102, 104, 106, 108, 110.

Figure 2:
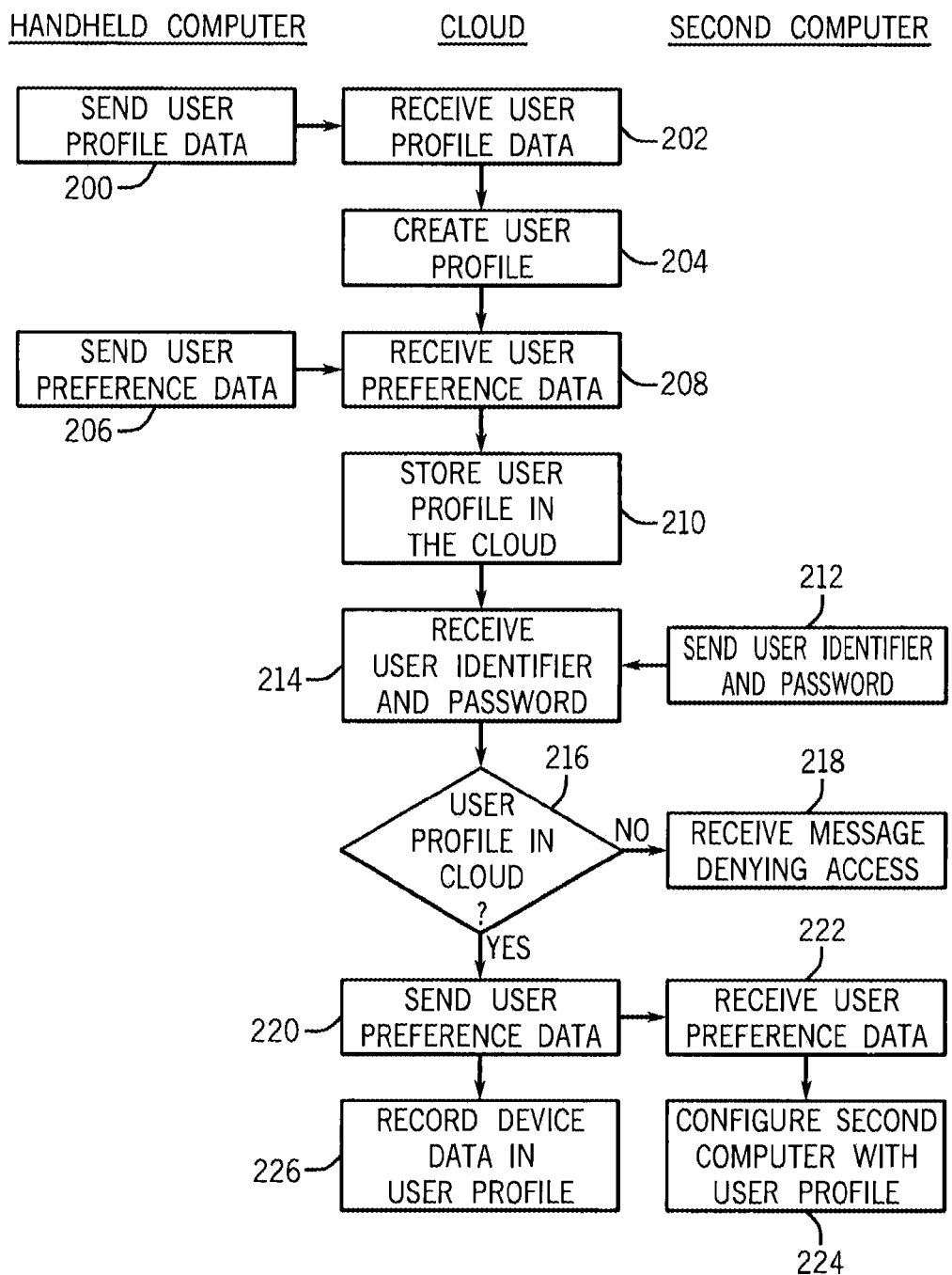
FIG. 2 is a flowchart of a method of managing a user profile in a cloud, according to an exemplary embodiment.

Referring now to FIG. 2, a method of managing or maintaining a user profile or identity in a cloud will be described. The user profile or account may be created, for example, at the time of purchase and first use of device 102. Device 102 may be configured to operate a "first use" or "registration" application configured to collect user data from a person using the device and to use the device to create the user profile and/or a user account in the cloud 100. The user account may be the same account or a different account than an account used for wireless services with a wireless carrier. According to one exemplary embodiment, device 102 is configured to allow the use of wireless services (e.g. via a device activation process) only if a user profile is created in the cloud 100 (e.g. via a user registration process); otherwise, device 102 is configured to not allow a user to use wireless services (i.e., the device is not activated on with the wireless carrier, perhaps except for emergency services), such as voice services, data services, etc. According to another embodiment, a wireless carrier, manufacturer of device 102, or other entity may create the user profile. The user may then populate the user profile as described herein.

At operation 200, device 102 is configured to receive user profile data from a user and/or from memory and to transmit the user profile data to the shared, scalable computing resource 100. At operation 202, resource 100 is configured to receive the user profile data from handheld computer 102. The user profile data comprises at least a user security factor, such as user identifier and a password in this exemplary embodiment, which may also comprise a single private key, a token, a SAML (Security Assertion Markup Language) assertion, security information, verification information, or other user security data. The user profile data is received via a secure wireless communication protocol having authentication of an identity of the handheld computer. According to one exemplary embodiment, each of computing devices 102-110 may comprise a circuit configured to store and communicate an authentication key to be used by the shared, scalable computing resource to authenticate the identities computing devices 102-110. The secure protocol may comprise two layers: a transport layer and an application layer. At the transport layer, the secure protocol may use an HTTPS/SSL (Hyper Text Transfer Protocol Secure over Secure Socket Layer) encrypted communication channel to interact between the device and resource 100. At the application layer, for communications between the device and resource, the device provides three items: a unique token (one way encrypted hash), a device ID and a user email address. These are provided in addition to the functional payload used for the API being called. Using these, the server can validate the authenticity of the device making the call. Alternative secure wireless communication protocols may be used.

At operation 204, shared resource 100 is configured to create or update (if already created) a user profile stored on resource 100. Resource 100 is configured to store the user profile data on the shared, scalable computing resource as a portion of a user profile, the user profile further comprising user preference data. According to one embodiment, handheld computer 102 is configured to send user preference data at operation 206, which is received at an operation 208 by resource 100. The user preference data may be directly entered by a user, collected from device 102, or collected over time based on usage of device 102 by the user (e.g., the setting of a bookmarked web page, a favorite, downloaded applications, etc.).

FIG. 2 further illustrates the association of a second computer (e.g., any of computing devices 104-110, which may be a person's second computing device, a friend's computing device, the person's desktop computer, etc.) with the user profile. At operation 212, the second computer is configured to send a user identifier and password (or other user security factor) to the resource 100. At operation 214, resource 100 is configured to receive the user identifier and password via a secure wireless communication protocol having authentication of an identity of the second computing device. At operation 216, resource 100 is configured to determine whether the user identifier and password matches the user identifier and password of a user profile stored in resource 100. If not, at operation 218, resource 100 transmits a message to the second computer indicating the user identifier and/or password is incorrect or that no associated user profile has been found in resource 100. If the user ID and password match that of a user profile stored in resource 100, at operation 220 an association is made between the user profile and the second computer, which may comprise downloading or sending user preference data to the second computer (operation 220), wherein the second computer receives the user preference data at operation 222 and configures the second computer with the user preference data (operation 224). The association of the second computer with the user profile may further comprise recording device data for the second computer in the user profile (at operation 226). The association may further comprise providing a graphic user interface and/or "look and feel" on the second computer based on the user preference data (e.g., background photograph, color scheme, application icon arrangement, etc.). The association may further comprise downloading and/or encrypting and downloading one or more of the contents of the user profile from the user profile to the second computing device. The association may further comprise downloading identifiers of user-selected applications (e.g., application data 128) to the second computer and/or the shared resource 100 downloading or coordinating the download of the plurality of applications to the second computing device.

According to one advantageous feature, the second computer may use a different wireless carrier to access the resource 100 than the handheld computer. For example, the user profile data may be received from the handheld computer via a wireless communication network operated by a first wireless carrier, wherein the user identifier and password are received from the second computing device via a wireless communication network operated by a second wireless carrier different than the first wireless carrier. The account management service operating on resource 100 may be agnostic to the transport and may function as long as there is network connectivity as it may be TCP/IP based. In this manner, user of the user profile by different devices may be carrier-independent.

The identity management service of resource 100 described herein may allow users to switch devices and manage resources in the cloud by strictly identifying the device with the account. Examples of resources that may be managed are backups of data, exporting backup information, executing a remote device wipe (or data delete) action, viewing pictures stored in the cloud, accessing shared data, or other resource management actions.

According to one advantageous feature, a non-handheld computer, such as a personal computer or a laptop computer, could operate as the second computer. The second computer may receive a user ID and password for a user profile previously created for a user's handheld computing device. The second computer may be configured to transmit the user ID and password to the cloud, and the cloud may be configured to respond by downloading an application, such as a thin client, having code configured to present a user interface similar to the user interface provided by the handheld computing device. For example, a similar or same color scheme, arrangement of application icons, arrangement of contacts, calendar, e-mail icons, background photograph, keyboard layout, hard button arrangement, etc. may be shown on a display coupled to the second computer as would be seen when holding the handheld computer. Application virtualization may be operable on one or more of the handheld computer, cloud, and second computing device to provide this feature. According to one embodiment, user inputs may be received from the second computing device by interaction with a virtual image of the handheld computing device. Cloud 100 may then pass the user inputs to the handheld device to control the handheld device. The handheld device may transmit changes in the user interface to the cloud 100 to be passed to the second computing device for display to the user. In this way, a user may access and control the handheld computing device from a second computing device.

According to another exemplary embodiment, resource 100 may be configured to authenticate each of the handheld device and the second computing device prior to associating each with the user profile. Resource 100 may then be configured to facilitate synchronization of data between the handheld device and the second computing device, because resource 100 has certified the authenticity of both devices. Synchronization of data may comprise establishing consistency of data among two or more devices as well as maintaining consistency. The data may be personal data, such as contacts, calendar appointments, e-mails, browser favorites, etc.

According to one advantageous aspect, the user profile may provide a roaming identity for a person, which is unique to the person though available to multiple devices. A person may be allowed to switch devices and manage resources in the cloud, because the cloud can identify the device with the account or user profile. The account or user profile then may become a secure way to store personal or private data.

According to another advantageous aspect, the second computing device may be a replacement for a lost or stolen handheld computing device.

According to one embodiment, data in the user profile can be used to access or retrieve other services available on or via the shared resource 100, such as, backup and restore of personal data, software updates of an operating system and/or applications operating on handheld device 102, kill pill or lock operations to delete personal data from device 102 or prevent access to part or all of device 102 in the event it is lost or stolen, and/or other services. The other services may access data in the user profile as needed to operate their respective functionalities.

According to another exemplary embodiment, the shared resource 100 is configured to store conversion data used to convert or adapt data protocols, formats, graphics, etc. from one to another of the computing devices 102-110 as needed to allow the use of the user profile with the different device types having different device characteristics.

According to one embodiment, the system operable in the shared resource 100 is maintained or controlled by a manufacturer of device 102 (or another of devices 104-110), while the shared resource 100 may be maintained or controlled by a third party, such as Google, Amazon, Microsoft, or other companies.

According to another exemplary embodiment, the user profile or account may comprise one or more of the data below. In some embodiments, this user profile can be encoded as a text flat file, in XML and/or in other suitable formats.

Accounts
    First Name
    Last Name
    Email
    Password
    Challenge Questions and Answer
    Language & Country
Device
    Platform (or operating system, project name, etc.)
    Carrier (Sprint, AT&T, Verizon, etc.)
    Network (CDMA or GSM)
    Device Model (number project name, etc.)
    Device ID (may be IMEI:[0-9] {14-17} or MEID:[A-F0-9] {14-17} and may be unique)
    NduID (may be unique A-F0-9 {40} 40 characters HEX value)
    Serial No
    Phone No
    Home MCC
    Home MNC
    Current MCC
    Current MNC
    Software Build No.
    Firmware Version
    Mac Address ROM Token
    clientAuthType
    serverAuthType
    clientNonce
    serverNonce
    clientPwd
    serverPwd
    clientCredentials
    softwareBuildBranch
    buildVariant According to another embodiment, resource 100 may be configured to provide a web page accessible via the Internet to allow a user to go online and change or add a configuration for device 102 to move from one wireless carrier to another, different wireless carrier. In this case, the user profile data will go with the user from the first carrier to the second carrier without requiring a new registration or creation of a user profile or account. In this manner, a user's personal data travels with the user instead of with the carrier by way of the user profile.

According to some advantageous aspects, a user profile is carrier-independent and/or independent of the device. One user may be associated with more than one device. User profile information is tied to a user, not to a device. When a user downloads an application, resource 100 registers that application against the user. When resource 100 backs up data, such as personal information management data, the data is backed up against the user. Further, a user may move from one device to another, but still retain the user's identity. The devices may have the same operating system, such as a webOS operating system, or may have different operating systems.

According to some embodiments, the systems and methods described herein may uniquely identify the user and the device they are using in a way that the user profile is re-usable when the user moves between devices. The systems and methods may further deterministically determine that a same user is moving between devices and therefore provide services and manage user data without any direct dependency on a specific device.

According to some embodiments, as the systems and methods described herein can determine the device, they can, together with the information about the user profile (of the user using it), provide services that are appropriate for that device specifically—for example, download only applications that are compatible with that device.

Figure 3:
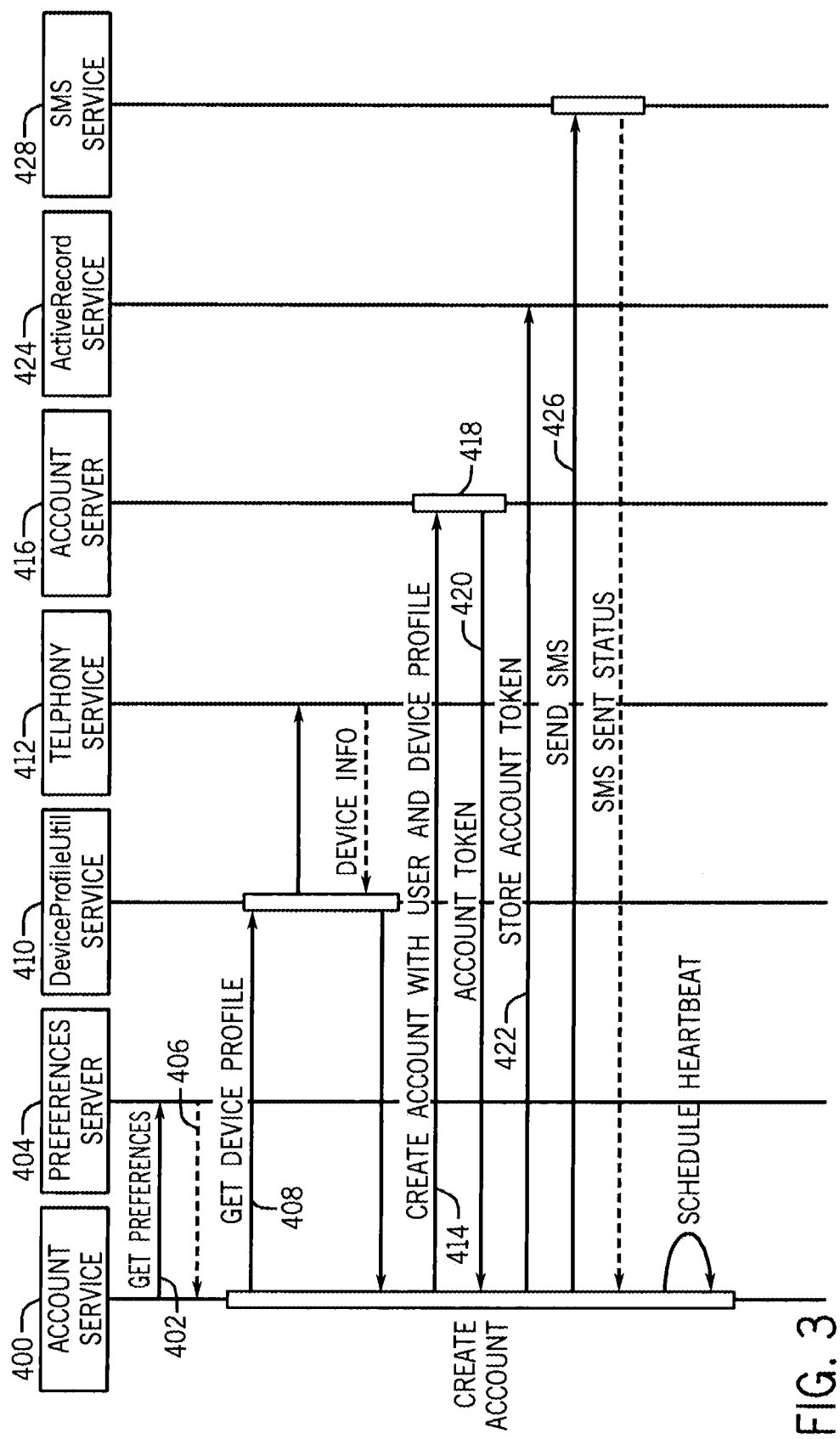
FIG. 3 is a data flow diagram of a method of identity management, according to an exemplary embodiment.

Referring now to FIG. 3, a method of creating an account or establishing an identity or user profile will be described, according to an exemplary embodiment. During a first use of the device (e.g., after purchase), an account service 400 on the device (e.g., part of the operating system of the device) is configured to operate an account creation function. At operation 402, account service 400 is configured to request or retrieve a configuration or preferences from a preferences server 404 operating in the cloud. The request may be an anonymous call, which may not require authentication. Preferences server 404 is configured to store data indicating where the various account services are (e.g., their URLs) or what the device needs to do to call them. Preferences server 404 may be configured to return one or more account services URLs at an operation 406.

At operation 408, account service 400 is configured to request or retrieve device profile data from a device profile utility service 410. Device profile data may include, for example, the device ID, identification of the cellular network the device is on, etc. Some of the device profile data may be obtained from a telephony service 412 operating on the device. All retrieved device profile data is returned to account service 400.

At operation 414, a request is made to account server 416 operable in the cloud to create an account with user and device profile. In this process, the device is configured to prompt a user for an email address and password. The device sends credentials, e.g., email and password, to account server 416. Account server 416 may validate the email to confirm that the communication is allowed, authenticated, and/or that the device is not in use already. If the email is already in use by a user, the user password is validated to a match. If not matched, the user is prompted to re-enter the password via account service 400. If the user fails to authenticate the password against an existing email, the user cannot use the phone for wireless communications. If the user is authenticated with an existing email and password by account server 416 (at operation 418), the user is logged in to the new device and logged out of a previous device (if existing).

If the email is not in use, the user is prompted for signing an end user license agreement (EULA). If a new account is needed, new account data is created in the cloud with new credentials and the user is asked for first name and last name, which are sent to the server. The account server 416 generates a token, e.g., a GUID or global unique identifier, which may comprise a one-way hash function of certain data, such as hardware identifiers, MAC identifiers, etc. At operation 420, the account token is returned to account service 400. In future communications, at least one or more of the e-mail, token, and device ID are used to verify authenticity of communications from the device. In one embodiment, all calls from the device to the server provide the e-mail, token and device ID, which are checked at the server for a match as part of the authentication process.

At operation 422, the account token is stored in a database 424 local to the device. The database 424 limits access to only certain applications to maintain security of the account token.

At operation 426, an SMS is sent through an SMS service 428 on the device to the server system in the cloud. This SMS may be a mobile-originated message and may be used by the system to get a guaranteed phone number for the device.

The method described with reference to FIG. 3 may provide one or more of: uniquely identifying a device, uniquely identifying a user, associating a device with a user, and generating and storing a unique token for authentication.

According to another exemplary embodiment, resource 100 may control access to user profile 120 to allow multiple users to share a device but not at the same time.

Exemplary Mobile Device

Referring to FIGS. 5-8, a mobile device 10 is shown. The teachings herein can be applied to device 10 or to other electronic devices (e.g., a desktop computer), such as mobile computing devices (e.g., a laptop computer) or handheld computing devices, such as a personal digital assistant (PDA), smartphone, mobile telephone, personal navigation device, handheld digital camera, handheld relative navigation device, etc. According to one embodiment, device 10 may be a smartphone, which is a combination mobile telephone and handheld computer having PDA functionality. PDA functionality can comprise one or more personal information management applications (e.g., including personal data applications such as email, calendar, contacts, etc.), database functions, word processing, spreadsheets, voice memo recording, Global Positioning System (GPS) functionality, etc. Device 10 may be configured to synchronize (e.g., two-way file synchronization) personal information from these applications with a computer (e.g., a desktop, laptop, server, etc.). Device 10 may be further configured to receive and operate additional applications provided to device 10 after manufacture, e.g., via wired or wireless download (such as from an "application store" operable on remote server computers), Secure Digital card, etc.

As shown in FIGS. 5-8, device 10 includes a housing 12 and a front 14 and a back 16. Device 10 further comprises a display 18 and a user input device 20 (e.g., a QWERTY keyboard, buttons, touch screen, microphone for speech recognition engine, etc.). Display 18 may comprise a touch screen display in order to provide user input to a processor 102 (see FIG. 4) to control functions, such as to select options displayed on display 18, enter text input to device 10, or enter other types of input. Display 18 also provides images (e.g., a geographic map, application icons, a web browser, etc.) that are displayed and may be viewed by users of device 10. User input device 20 can provide similar inputs as those of touch screen display 18. An input button 40 may be provided on front 14 and may be configured to perform pre-programmed functions. Device 10 can further comprise a speaker 26, a stylus (not shown) to assist the user in making selections on display 18, a camera 28, a camera flash 32, a microphone 34, and an earpiece 36. Display 18 may comprise a capacitive touch screen, a mutual capacitance touch screen, a self capacitance touch screen, a resistive touch screen, a touch screen using cameras and light such as a surface multi-touch screen, proximity sensors, or other touch screen technologies. Display 18 may be configured to receive inputs from finger touches at a plurality of locations on display 18 at the same time. Display 18 may be configured to receive a finger swipe or other directional input, which may be interpreted by a processing circuit to control certain functions distinct from a single touch input. Further, a gesture area 30 may be provided adjacent (e.g., below, above, to a side, etc.) or be incorporated into display 18 to receive various gestures as inputs, including taps, swipes, drags, flips, pinches, and so on, including multiple touch and multiple swipe commands (e.g., to zoom and/or pan an image such as a geographic map). One or more indicator areas 38 (e.g., lights, etc.) may be provided to indicate that a gesture has been received from a user.

According to an exemplary embodiment, housing 12 is configured to hold a screen such as display 18 in a fixed or movable (e.g., slidable, rotatable, hinged, etc.) relationship above a user input device such as user input device 20 in a substantially parallel or same plane, or in a different plane. This fixed relationship excludes a hinged or movable relationship between the screen and the user input device (e.g., a plurality of keys) in the fixed embodiment.

Device 10 may be a handheld computer, which is a computer small enough to be carried in a hand of a user, comprising such devices as typical mobile telephones and personal digital assistants, but excluding typical laptop computers and tablet PCs. The various input devices and other components of device 10 as described below may be positioned anywhere on device 10 (e.g., the front surface shown in FIG. 6, the rear surface shown in FIG. 7, the side surfaces as shown in FIG. 8, etc.). Furthermore, various components such as a keyboard etc. may be retractable to slide in and out from a portion of device 10 to be revealed along any of the sides of device 10, etc. For example, as shown in FIGS. 6-8, front 14 may be slidably adjustable relative to back 16 to reveal input device 20, such that in a retracted configuration (see FIG. 5) input device 20 is not visible, and in an extended configuration (see FIGS. 6-8) input device 20 is visible.

According to various exemplary embodiments, housing 12 may be any size, shape, and have a variety of length, width, thickness, and volume dimensions. For example, width 13 may be no more than about 200 millimeters (mm), 100 mm, 85 mm, or 65 mm, or alternatively, at least about 30 mm, 50 mm, or 55 mm. Length 15 may be no more than about 200 mm, 150 mm, 135 mm, or 125 mm, or alternatively, at least about 70 mm or 100 mm. Thickness 17 may be no more than about 150 mm, 50 mm, 25 mm, or 15 mm, or alternatively, at least about 10 mm, 15 mm, or 50 mm. The volume of housing 12 may be no more than about 2500 cubic centimeters (cc) or 1500 cc, or alternatively, at least about 1000 cc or 600 cc.

Device 10 may provide voice communications or telephony functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, etc.

In addition to voice communications functionality, device 10 may be configured to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Long Term Evolution (LTE) systems, etc.

Device 10 may be configured to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

Device 10 may be configured to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, etc.

Figure 4:
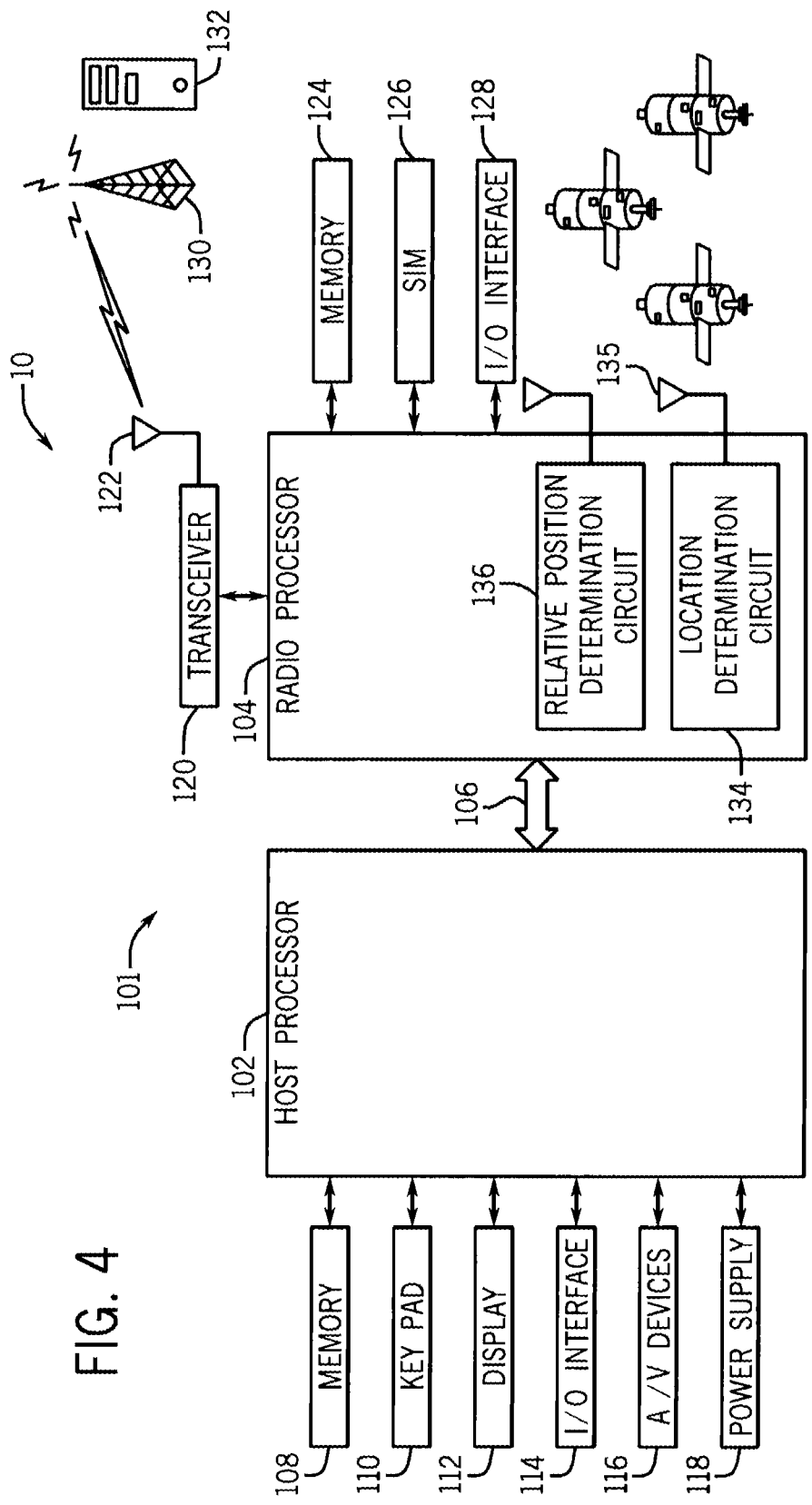
FIG. 4 is a block diagram of a mobile computing device, according to an exemplary embodiment.

As shown in the embodiment of FIG. 4, device 10 may comprise a processing circuit 101 having a dual processor architecture including a host processor 102 and a radio processor 104 (e.g., a base band processor). The host processor 102 and the radio processor 104 may be configured to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, shared memory, and so forth.

The host processor 102 may be responsible for executing various software programs such as application programs and system programs to provide computing and processing operations for device 10. The radio processor 104 may be responsible for performing various voice and data communications operations for device 10 such as transmitting and receiving voice and data information over one or more wireless communications channels. Although embodiments of the dual processor architecture may be described as comprising the host processor 102 and the radio processor 104 for purposes of illustration, the dual processor architecture of device 10 may comprise additional processors, may be implemented as a dual- or multi-core chip with both host processor 102 and radio processor 104 on a single chip, etc.

In various embodiments, the host processor 102 may be implemented as a host central processing unit (CPU) using any suitable processor or logic device, such as a general purpose processor. The host processor 102 may comprise, or be implemented as, a chip multiprocessor (CMP), dedicated processor, embedded processor, media processor, input/output (I/O) processor, co-processor, a field programmable gate array (FPGA), a programmable logic device (PLD), or other processing device in alternative embodiments. In an exemplary embodiment, host processor 102 is an OMAP2, such as an OMAP2431 processor, manufactured by Texas Instruments, Inc.

The host processor 102 may be configured to provide processing or computing resources to device 10. For example, the host processor 102 may be responsible for executing various software programs such as application programs and system programs to provide computing and processing operations for device 10. Examples of application programs may include, for example, a telephone application, voicemail application, e-mail application, instant message (IM) application, short message service (SMS) application, multimedia message service (MMS) application, web browser application, personal information manager (PIM) application, contact management application, calendar application, scheduling application, task management application, word processing application, spreadsheet application, database application, video player application, audio player application, multimedia player application, digital camera application, video camera application, media management application, a gaming application, and so forth. The application software may provide a graphical user interface (GUI) to communicate information between device 10 and a user.

System programs assist in the running of the computer system. System programs may be directly responsible for controlling, integrating, and managing the individual hardware components of the computer system. Examples of system programs may include, for example, an operating system (OS), device drivers, programming tools, utility programs, software libraries, an application programming interface (API), graphical user interface (GUI), a username/password protection program, and so forth. Device 10 may utilize any suitable OS in accordance with the described embodiments such as a Palm webOS, Palm OS®, Palm OS® Cobalt, Microsoft® Windows OS, Microsoft Windows® CE, Microsoft Pocket PC, Microsoft Windows Mobile, Symbian OS™, Embedix OS, Linux, Binary Run-time Environment for Wireless (BREW) OS, JavaOS, a Wireless Application Protocol (WAP) OS, etc.

Device 10 may comprise a memory 108 coupled to the host processor 102 and a memory 124 coupled to the radio processor 104. In various embodiments, memories 108, 124 may be configured to store one or more software programs to be executed by the host processor 102 and/or radio processor 104. The memory 108 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), read-only memory (ROM), flash memory, or any other type of media suitable for storing information.

Although the memory 108 may be shown as being separate from the host processor 102 for purposes of illustration, in various embodiments some portion or the entire memory 108 may be included on the same integrated circuit as the host processor 102. Alternatively, some portion or the entire memory 108 may be disposed on an integrated circuit or other medium (e.g., hard disk drive) external to the integrated circuit of host processor 102. In various embodiments, device 10 may comprise an expansion slot to support a multimedia and/or memory card, for example.

Device 10 may comprise a user input device 110 coupled to the host processor 102. The user input device 110 may comprise, for example, a QWERTY and/or alphanumeric key layout and an integrated number dial pad. Device 10 also may comprise various keys, buttons, and switches such as, for example, input keys, preset and programmable hot keys, left and right action buttons, a navigation button such as a multi-directional navigation button, phone/send and power/end buttons, preset and programmable shortcut buttons, a volume rocker switch, a ringer on/off switch having a vibrate mode, a keypad, an alphanumeric keypad, and so forth.

The host processor 102 may be coupled to a display 112. The display 112 may comprise any suitable visual interface for displaying content to a user of device 10. For example, the display 112 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

Device 10 may comprise an input/output (I/O) interface 114 coupled to the host processor 102. The I/O interface 114 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, device 10 may be configured to transfer and/or synchronize information with the local computer system.

The host processor 102 may be coupled to various audio/video (A/V) devices 116 that support A/V capability of device 10. Examples of A/V devices 116 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 118 configured to supply and manage power to the elements of device 10. In various embodiments, the power supply 118 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for device 10. For example, the radio processor 104 may be configured to communicate voice information and/or data information over one or more assigned frequency bands of a wireless communication channel. In various embodiments, the radio processor 104 may be implemented as a communications processor using any suitable processor or logic device, such as a modem processor or base band processor. The radio processor 104 may comprise, or be implemented as, a digital signal processor (DSP), media access control (MAC) processor, or any other type of communications processor in accordance with the described embodiments. Radio processor 104 may be any of a plurality of modems manufactured by Qualcomm, Inc. or other manufacturers.

In various embodiments, the radio processor 104 may perform analog and/or digital base band operations for device 10. For example, the radio processor 104 may perform digital-to-analog conversion (DAC), analog-to-digital conversion (ADC), modulation, demodulation, encoding, decoding, encryption, decryption, and so forth.

Device 10 may comprise a transceiver module 120 coupled to the radio processor 104. The transceiver module 120 may comprise one or more transceivers configured to communicate using different types of protocols, communication ranges, operating power requirements, RF sub-bands, information types (e.g., voice or data), use scenarios, applications, and so forth. In various embodiments, the transceiver module 120 may comprise one or more transceivers configured to support voice communication for a cellular radiotelephone system such as a GSM, UMTS, CDMA, and/or LTE system. The transceiver module 120 also may comprise one or more transceivers configured to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth.

The transceiver module 120 may be implemented using one or more chips as desired for a given implementation. Although the transceiver module 120 may be shown as being separate from and external to the radio processor 104 for purposes of illustration, in various embodiments some portion or the entire transceiver module 120 may be included on the same integrated circuit as the radio processor 104.

Device 10 may comprise an antenna system 122 for transmitting and/or receiving electrical signals. As shown, the antenna system 122 may be coupled to the radio processor 104 through the transceiver module 120. The antenna system 122 may comprise or be implemented as one or more internal antennas and/or external antennas.

Device 10 may comprise a subscriber identity module (SIM) 126 coupled to the radio processor 104. The SIM 126 may comprise, for example, a removable or non-removable smart card configured to encrypt voice and data transmissions and to store user-specific data for allowing a voice or data communications network to identify and authenticate the user. The SIM 126 also may store data such as personal settings specific to the user.

Device 10 may comprise an I/O interface 128 coupled to the radio processor 104. The I/O interface 128 may comprise one or more I/O devices to enable wired (e.g., serial, cable, etc.) and/or wireless (e.g., WiFi, short range, etc.) communication between device 10 and one or more external computer systems.

In various embodiments, device 10 may comprise location or position determination capabilities. Device 10 may employ one or more absolute position determination techniques including, for example, Global Positioning System (GPS) techniques, Cell Global Identity (CGI) techniques, CGI including timing advance (TA) techniques, Assisted GPS (AGPS) techniques, hybrid techniques, etc. A Wi-Fi Positioning System may be used as another type of absolute positioning system, such as one provided by Skyhook Wireless, Inc., Boston, Mass. For example, an absolute positioning circuit may be configured to collect Wi-Fi identifier data from a plurality of nearby Wi-Fi access points (e.g., any wireless transceiver communicating according to an IEEE 802.11x protocol) and retrieve a latitude/longitude or other absolute position from a database by looking up the Wi-Fi access point identifiers received in the position of interest. In another example, a Wi-Fi access point may be configured to transmit its absolute position and device 10 may be configured to determine that its absolute position is the position of the Wi-Fi access point, within a predetermined error. Another type of absolute positioning system having less accuracy than GPS is a Cell-ID triangulation positioning system, such as one provided by Telmap, Ltd., London, United Kingdom.

Referring again to FIG. 4, processing circuit 101 may comprise a relative position determination circuit 136, shown in exemplary form as a part of the radio processor 104, though circuit 136 may be part of host processor 102 or any other portion of processing circuit 101. The relative position determination circuit may comprise circuitry and/or software configured to provide relative position data for device 10 relative to an object.

In various embodiments, device 10 may comprise dedicated hardware circuits or structures, or a combination of dedicated hardware and associated software, to support absolute and/or relative position determination. For example, the transceiver module 120 and the antenna system 122 may comprise GPS receiver or transceiver hardware and one or more associated antennas coupled to the radio processor 104 to support position determination.

The host processor 102 may comprise and/or implement at least one LBS (location-based service) application. In general, the LBS application may comprise any type of client application executed by the host processor 102, such as a GPS application, configured to communicate location requests (e.g., requests for position fixes) and location responses. Examples of LBS applications include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest (POI) such as restaurants, hotels, landmarks, and entertainment venues, and other types of LBS services in accordance with the described embodiments.

Radio processor 104 also may set request/response parameters to request and return various types of position information. Examples of request/response parameters may include current location, latitude, longitude, altitude, heading, vector information such as horizontal and vertical velocity, sector-based position location, position fix method, level of accuracy, time offset, position uncertainty, device orientation, client initialization and registration, and so forth.

Various embodiments disclosed herein may include or be implemented in connection with computer-readable media configured to store machine-executable instructions therein, and/or one or more modules, circuits, units, or other elements that may comprise analog and/or digital circuit components (e.g. a processor or other processing circuit) configured or arranged to perform one or more of the steps recited herein. By way of example, computer-readable media may include non-transitory media such as RAM, ROM, CD-ROM, or other optical disk storage, magnetic disk storage, flash memory, or any other medium capable of storing and providing access to desired machine-executable instructions. The use of circuit or module herein is meant to broadly encompass any one or more of discrete circuit components, analog and/or digital circuit components, integrated circuits, solid state devices and/or programmed portions of any of the foregoing, including microprocessors, microcontrollers, ASICs, programmable logic, or other electronic devices.

While the detailed drawings, specific examples and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the present disclosure as expressed in the appended claims.

What is claimed is:

1. A method of maintaining a user profile for a handheld computer in a shared, scalable computing resource, comprising:
    receiving user profile data from the handheld computer at the shared, scalable computing resource via a first wireless carrier, the user profile data comprising a user security factor, wherein the user profile data is received via a secure wireless communication protocol having authentication of an identity of the handheld computer;
    storing the user profile data on the shared, scalable computing resource as a portion of a user profile, the user profile further comprising user preference data;
    receiving the user security factor from a second computing device via a second wireless carrier, wherein the first wireless carrier is different than the second wireless carrier and the user security factor is received via a secure wireless communication protocol having authentication of an identity of the second computing device;
    downloading user preference data to the second computing device;
    receiving, by the shared, scalable computing resource, information associated with user input received at the second computing device;
    sending by the shared, scalable computing resource, to the handheld device, the information associated with the user input received at the second computing device;
    receiving, by the shared, scalable computing system, from the handheld device, changes in a user interface of the handheld device based on the information associated with the user input received at the second computing device; and
    sending, from the shared, scalable computing system, to the second computing device, the changes in the user interface of the handheld device for updating a user interface displayed by the second computing device.

2. The method of claim 1, wherein the user security factor comprises an email address, wherein the computing resource is configured to store only one user profile associated with the email address.

3. The method of claim 1, wherein the user profile data is received from the handheld computer via a wireless communication network operated by the first wireless carrier, wherein a user identifier and password are received from the second computing device via a wireless communication network operated by the second wireless carrier.

4. The method of claim 1, further comprising receiving from a user selections of a plurality of applications operable on the handheld computer, storing identifiers of the user selections in the user profile, and downloading the plurality of applications to the second computing device in response to receiving the user security factor from the second computing device.

5. The method of claim 1, wherein the second computing device is a printer or a digital picture frame.

6. The method of claim 1, further comprising storing at least one of credit card information, bank account information, and billing information in the user profile.

7. The method of claim 1, further comprising receiving a request to manage a resource associated with the user account and executing the request.

8. The method of claim 1, further comprising receiving data indicating a maximum number of devices that may be associated with the user profile and storing the number in the user account.

9. The method of claim 1, further comprising storing device identifier data and a plurality of device characteristics for each of a plurality of different devices in the user profile.

10. The method of claim 9, wherein the device characteristics comprise a different wireless carrier for each of the plurality of different devices.

11. The method of claim 1, wherein the user security factor comprises a user name and a user password.

12. The method of claim 1, wherein the user preference data comprises at least one of an email address, a security question/answer, a billing address, a mailing address, a list of bookmarks, a list of favorites, a screen color or a background photo.

13. The method of claim 1, comprising controlling the handheld computing device from the second computing device.

14. A system for maintaining a user profile for a handheld computer in a shared, scalable computing system, comprising:
    one or more processors;
    memory coupled to the one or more processors, the memory configured to store instructions that, when executed by the one or more processors, cause the shared, scalable computing system to:
        receive user profile data from the handheld computer via a first wireless carrier, wherein the user profile data is received via a secure wireless communication protocol having authentication of an identity of the handheld computer, the user profile data comprising:
            a user security factor, and
            user preference data;
        store the user profile data as a portion of a user profile;
        receive the user security factor from a second computing device via a second wireless carrier, wherein the first wireless carrier is different than the second wireless carrier, wherein the user security factor is received via a secure wireless communication protocol having authentication of an identity of the second computing device;
        download user preference data to the second computing device;
        receive information associated with user input received at the second computing device;
        send, to the handheld device, the information associated with the user input received at the second computing device;
        receive, by the shared, scalable computing system, from the handheld device, changes in a user interface of the handheld device based on the information associated with the user input received at the second computing device; and send, from the shared, scalable computing system, to the second computing device, the changes in the user interface of the handheld device for display by a user interface of the second computing device.

15. The system of claim 14, wherein each of the handheld computer and the second computing device comprise a circuit configured to store and communicate an authentication key to be used by the shared, scalable computing resource to authenticate the identities of the handheld computer and the second computing device.

16. The system of claim 14, wherein the handheld computing device is controlled from the second computing device.

17. A non-transitory computer-readable media configured to store machine-executable instructions to implement a method comprising:

receiving user profile data from a handheld computer at a shared, scalable computing resource via a first wireless carrier, the user profile data comprising a user security factor, wherein the user profile data is received via a secure wireless communication protocol having authentication of an identity of the handheld computer;

storing the user profile data on the shared, scalable computing resource as a portion of a user profile, the user profile further comprising user preference data;

receiving the user security factor from a second computing device via a second wireless carrier, wherein the first wireless carrier is different than the second wireless carrier and the user security factor is received via a secure wireless communication protocol having authentication of an identity of the second computing device;

downloading user preference data to the second computing device;

receiving, by the shared, scalable computing resource, information associated with user input received at the second computing device;

sending by the shared, scalable computing resource, to the handheld device, the information associated with the user input received at the second computing device;

receiving, by the shared, scalable computing system, from the handheld device, changes in a user interface of the handheld device based on the information associated with the user input received at the second computing device; and sending, from the shared, scalable computing system, to the second computing device, the changes in the user interface of the handheld device for updating a user interface displayed by the second computing device.

18. The non-transitory computer-readable media of claim 17 configured to store machine-executable instructions to implement a method further comprising controlling the handheld computing device from the second computing device.

* * * * *